Aug. 23, 1960 A. ALFORD 2,950,449

HYBRID TYPE NETWORK

Filed Nov. 21, 1956 3 Sheets-Sheet 1

INVENTOR.
Andrew Alford
BY Ezekiel Wolf
his Attorney.

Aug. 23, 1960 A. ALFORD 2,950,449

HYBRID TYPE NETWORK

Filed Nov. 21, 1956 3 Sheets-Sheet 2

INVENTOR.
Andrew Alford
BY
Ezekiel Wolf
his Attorney

Aug. 23, 1960 A. ALFORD 2,950,449

HYBRID TYPE NETWORK

Filed Nov. 21, 1956 3 Sheets-Sheet 3

INVENTOR.
ANDREW ALFORD
BY Ezekiel Wolf, Wolf + Greenfield
ATTORNEYS

United States Patent Office 2,950,449

Patented Aug. 23, 1960

2,950,449

HYBRID TYPE NETWORK

Andrew Alford, Winchester, Mass.
(299 Atlantic Ave., Boston, Mass.)

Filed Nov. 21, 1956, Ser. No. 623,560

4 Claims. (Cl. 333—11)

The present invention relates to a hybrid type circuit particularly designed to handle wide bands of frequencies.

In hybrid structures utilized previously, the range of frequencies over which they would accurately operate was severely limited. Ordinarily hybrids have a maximum range of frequency in the ratio of 2 to 1; as for example, from 120 to 240 megacycles, or 480 megacycles to 960 megacycles. In many instances, much wider ranges are necessary; as for example, a range of 200 to 900 megacycles, or a 4½ to 1 ratio. This requirement of a wide frequency range capacity has often necessitated the use of several interchangeable hybrids, with a single electronic instrument. Such multiplicity is not only economically undesirable, but also results in unnecessary delays in the substitution of one hybrid for another.

In the hybrids previously utilized for frequencies of 40 megacycles and up, for example, the particular frequency range for which the hybrid is designed is determinative of its overall size with the lowest frequency determining the maximum size of the hybrid. For example, in hybrids designed to be used with frequencies of 40 megacycles, the overall length of the hybrid would be approximately six feet long. A unit of such a length often poses major problems in instrument design and in addition, increases the cost not only of the hybrids, but also of associated structures.

These principal difficulties of hybrids previously known are overcome in the design of the present invention which provides a structure having the hybrid-like characteristics of previously known structures. The present invention provides a structure which is capable of handling frequencies over a range of approximately 5 to 1 or perhaps greater in a structure having an overall size substantially smaller than the size of hybrids for corresponding frequencies previously known. According to the invention, four terminal pairs are provided, each having a grounded or low and ungrounded or high terminal with the grounded terminals connected to common conducting means. A first of the ungrounded terminals is connected to the junction of first and second serially-connected resistors. Means, such as a balun, are provided for converting an unbalanced signal on a second of the ungrounded terminals to a balanced signal which is applied across the serially-connected resistors. The third and fourth ungrounded terminals are connected to the first and second resistors respectively at the ends away from their junction. The latter two terminals are referred to as side terminals I and II, respectively. The first terminal is referred to as the P or parallel feed input terminal because energy applied to this terminal is delivered to loads connected to the side terminals over parallel paths. The second terminal is referred to as the S or series feed input terminal because energy applied to this terminal is delivered to loads connected to the side terminals over a path effectively coupling said loads in series.

If the two resistors are of equal value and the loads connected to the side terminals are equal, the series feed input is isolated from the parallel feed input.

In a preferred embodiment of the invention, the balun comprises a coiled coaxial transmission line beside a coiled conductor essentially the mirror image of the coiled coaxial transmission line with the coils and the resistors symmetrically arranged within a conducting shield which forms the common conducting means. A balun formed in this manner presents a high impedance path to energy incident at the parallel feed input so that nearly all such energy is delivered to the side terminals over parallel paths. By connecting one end of the coiled transmission line center conductor to the series feed input terminal, the other end to one of the side terminals and the outer conductor of the coiled transmission line at said other end to the other side terminal, a low impedance path is provided for transferring energy from the series feed input to loads connected to the side terminals over a series path. The outer conductor is connected between ground and said other side terminal while the coiled conductor is connected between ground and said one side terminal.

The outer conductors of all coaxial terminals are connected to the metal shield of the network. The metal shield may be a closed metal enclosure or alternatively comprise only two parallel metal plates spaced at a distance which is small, for example ½ inch in comparison with their other dimensions, for example, 6 inches by 6 inches.

The previously enumerated objects and advantages of the present invention will be more clearly understood when considered in connection with a specific embodiment of the invention, as is illustrated in the accompanying drawings, in which.

Figure 2:
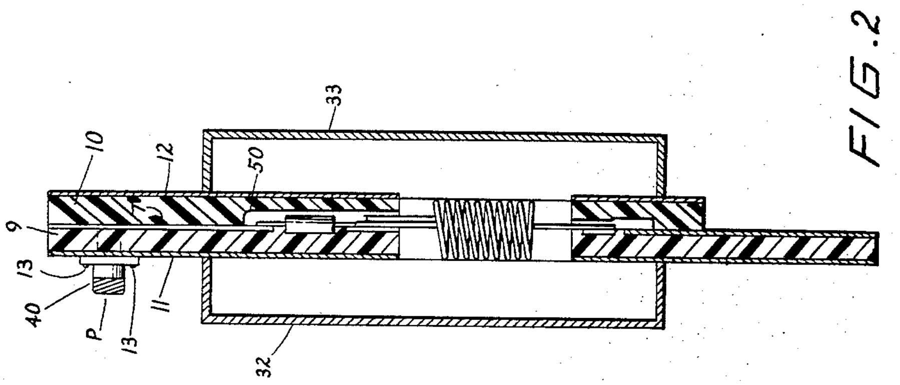
Figure 2 is a cross sectional view taken substantially along the line 2—2 of Figure 1.
Figure 1:
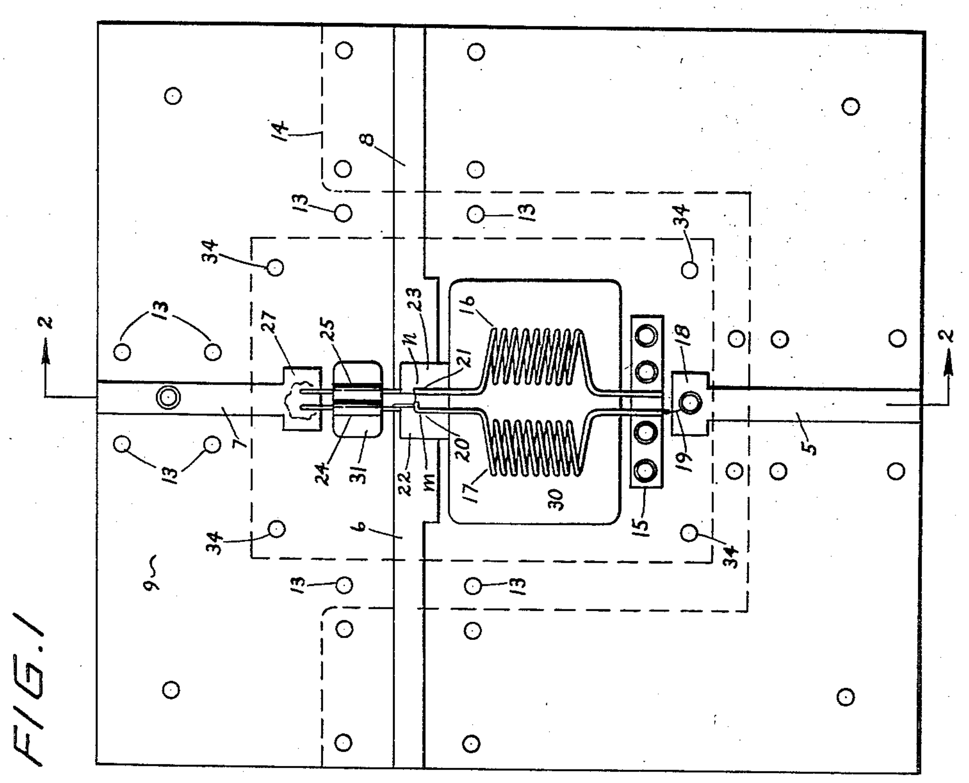
Figure 1 is a top plan view of the invention with upper plates removed.

In considering the specific embodiment of the present invention, as illustrated in the accompanying drawings, it should be understood that the description is merely illustrative of the invention and is not confined to the specific details as hereinafter enumerated in the specification.

In the hybrid of the present invention, there are provided four terminals, for convenience respectively labelled, terminals, S, I, P, and II. These which are illustrated at type N, coaxial cable terminals have their inner conductors connected respectively to strip members of copper 5, 6, 7 and 8. These strip members extend inwardly and are supported by and secured to a suitable dielectric material, such as preferably the substantially rectangular member 9. The surface of the copper strips 5, 6, 7 and 8 and the dielectric material 9 are coextensive and are in face to face relation with a second dielectric member 10. This second dielectric member 10, preferably has an outline indicated by numeral 14. The outer surfaces of the dielectric members 9 and 10 are covered with conductive members or coatings 11 and 12 formed of a layer or sheet of copper. The conductive members 11 and 12 are interconnected by a series of through-bolts or rivets 13, thereby forming with the strips 5, 6, 7 and 8, and the conductive sheets 11 and 12, a coaxial-like conductor line system. At the inner end of the strip 5, there is positioned a "ground plate" 15, suitably anchored to the dielectric material and electrically connected to the plates 11 and 12. Connected to this "ground plate" 15 are the first and second inner transmission lines 17 and 16, with the outer conductor of the line 17 being connected at one end to the ground member 15 and the inner insulated conductor 19 being connected to the end 18 of the strip 5. The inner conductor 19 of the line 17 is insulated from the outer conductor by dielectric coaxial material which may consist of material such as Teflon. The other end of the inner conductor 19 projects outwardly of the other end of the outer conductor of this coaxial line 17 and is connected to the other end of the line 16 at point *n*. The ends 20 and 21 of the lines 17 and 16 respectively are respectively connected to the "ungrounded" conductive blocks 22 and 23 by solder or other suitable material. These blocks 22 and 23 are insulated one from the other. A pair of resistors 24 and 25 at one end are connected one each to the terminals or blocks 22 and 23. The other ends of these resistors which should preferably be equal in size, are connected together at the inner end 27 of the strip 7 in turn connected to the inner conductor of the coaxial terminal P.

An opening 30 of rectangular shape is provided in the dielectric members 9 and 10 and conductive members 11 and 12. The lines 16 and 17 are positioned within this opening. A recess 31 is also provided in the dielectric plate 9 to receive the resistors 24 and 25. A recess 50 may be formed in the dielectric member 10 in the area covering these resistors 24 and 25 and the blocks 22 and 23. A conductive covering member is positioned over these openings and may consist of the rectangular caps 32 and 33 positioned respectively on either side of the conductive members 11 and 12. These caps 32 and 33 may be secured together and in position by through-bolts or the like which pass through openings indicated at 34.

The type N coaxial line connector 40 is secured by screws or suitable means to the conductive member 11 and projects normally from it with the outer conductor of this connector being connected electrically to the members 11 and 12, and with the inner conductor of the connector being electrically connected to the strip 7, but insulated from the members 11 and 12. Terminals I and II and S, each may have connected to them a type N connector 41, with the connector being mounted upon a removable block member 44. These block members are provided with shoulder sections 45 adapted to fit over and nestle against the dielectric member 9 over the strips 5, 6 and 8. The block members fit snugly against the walls of the dielectric member 10 and are substantially continuous with it. Each side of the block member has a metallic coat or conductive member with a parallel metallic strip between them. The outer or upper surface facing away from the dielectric member 9 on each block 44, is provided with the conductive member 46 of copper with this member 46 being electrically connected to the outer conductors of the connectors 41. The second conductive member 100 on the other side of the block is electrically connected to the plate 11 by a coupling plate 101. The screws 13 couple members 46, 100 and also partially secure connector 41 to member 46. Other screws 13 secure plate 11 and members 101 and 46 in sandwich fashion. The inner conductors of the connectors 41 are each connected to a strip of conductive material 47 of copper which rests in face to face relationship with one of the respective strips 5, 6 and 8, beyond the shoulder section of the block and form therewith continuous connections from the inner conductors of the connectors 41 to the inner end of the respective terminals with which the conductors 41 are connected. The outer plates 46 are connected electrically to the member 12 by means of conductive coupling plates 48 which are suitably secured by screws 49 or the like to the plate 12 and the plates 46.

In the operation of the present invention, a radio frequency potential may be applied to the terminal S from a suitable power source. This R.F. power is fed through the line 17 and together with the shunted connection to line 16 results in equal and opposite voltages being applied at points *m* and *n* of the blocks 22, 23, provided equal loads are connected to the terminals I and II. Under these conditions, equal and opposite voltages are supplied to resistors 24 and 25 so that at the junction of these resistors, and therefore, at terminal P, there will be no voltage. Similarly, by the "Reciprocity Theorem," a voltage applied to terminal P will result in no voltage at terminal S provided terminals I and II have equal loads connected to them. In the event that the loads at terminals I and II are unequal, a voltage will appear at the terminal P when terminal S is energized or vice versa. The voltage appearing at the output being related to the difference between the two loads.

By using a standard load at one of the terminals I or II and an unknown impedance at the other comprising for example both a resistive and reactive component, the phase and the magnitude of the voltage appearing at the output terminals are found to be related to the relation between the "unknown" impedance, and the "standard" load. By comparing this voltage at the output terminal with a reference voltage obtained from the input terminal, a measure of the unknown impedance may be obtained.

From the foregoing it will be clear that the present invention functioning as a hybrid is adapted for use as an impedance measuring device which has particular utility because of its reduced size and wide frequency range.

The lines 16 and 17 of the present invention are designed to provide as high an impedance between points *m* and *n* as possible consonant with the operational frequency range.

It is found that the overall unparalleled length of each coil should be kept somewhat shorter than a half wavelength of the highest frequency but of the same order of magnitude unless a magnetic core is used in which case the length should be decreased depending upon the increase in the flux.

The coiled outer conductors 17, 16, constitute a length of balanced transmission line which is effectively shunted across blocks 22, 23. The "far end" of the balanced transmission line is short circuited by metal strip 15. The impedance looking into the balanced line 16, 17, is approximately equal to its characteristic impedance 200 multiplied by the tangent of its effective electrical length expressed in electrical degrees. It is found that the charteristic impedance of a coiled line is greater than the characteristic impedance of an uncoiled line. It is also found that the electrical length of a coiled line is at least roughly equal to the uncoiled length of the helix. Because the characteristic impedance of the coiled line is high, even a relatively short length, $\theta$ (in electrical degrees) results is a high reactive impedance 200 tan $\theta$ being shunted across block 22, 23. When the impedance of the shunted coiled line is high, the impedance seen looking into terminal S is closer to the idealized condition in which only resistors 24, 25 and the loads connected to terminals I and II at P are in the circuit. Thus the circuit achieved by using the arrangement of this invention approximates a bridge circuit which has been made to operate with high accuracy at frequencies as high as 1000 megacycles.

Another embodiment of the invention contemplates removal of the dielectric material within the plates or shields except for supporting portions, and also complete enclosure of the internal components with a metallic box rather than the parallel plates forming shields.

Figures 3, 4, 5, 6, 7:
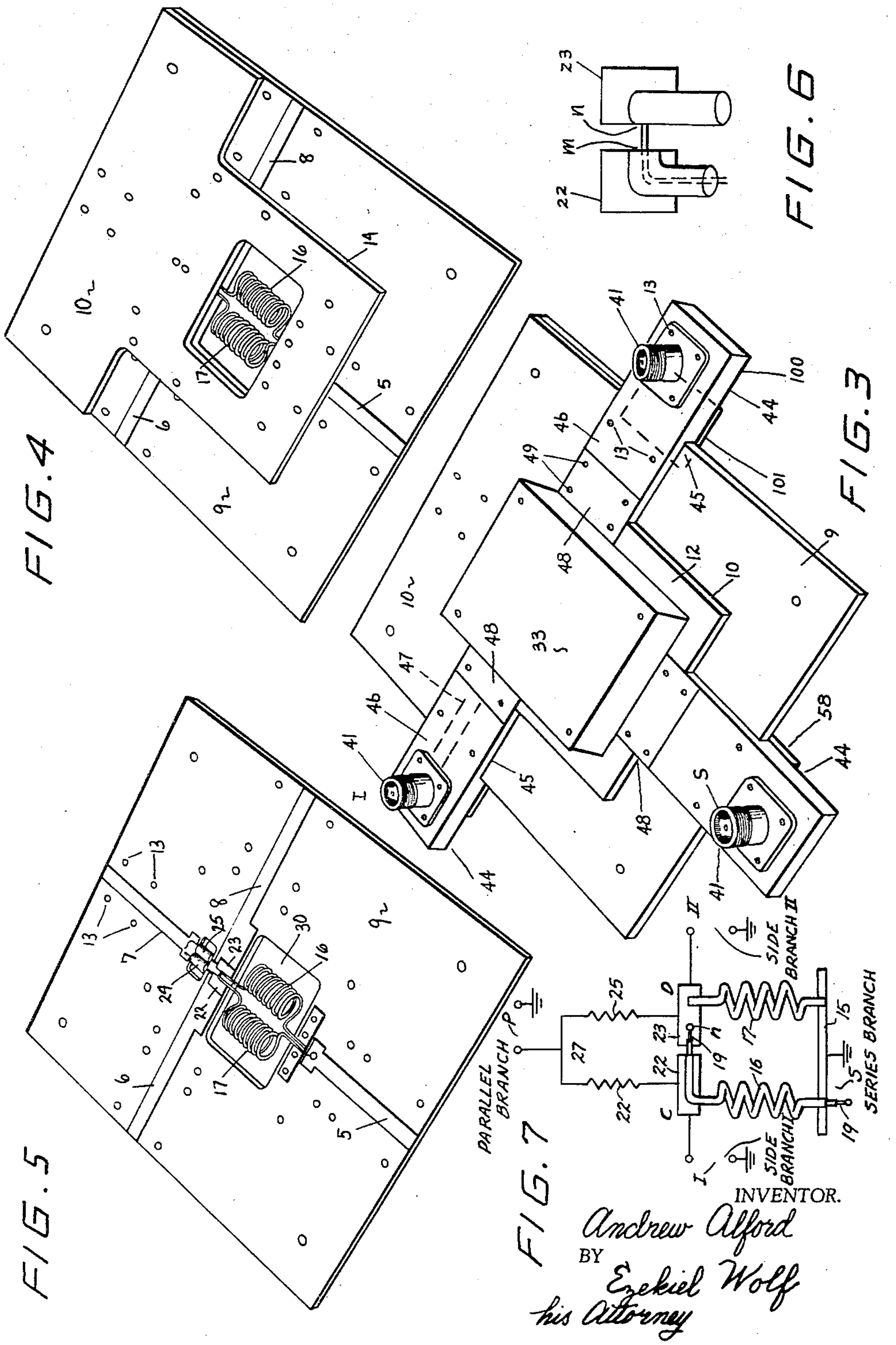
Figure 3 is a perspective assembled view of the invention.
Figure 4 is a perspective view of the invention with portions removed.
Figure 5 is also a perspective view of the invention with further portions removed.
Figure 6 is a detail of Figure 1.
Figure 7 is a schematic representation of a preferred embodiment of the invention.
Figure 7:
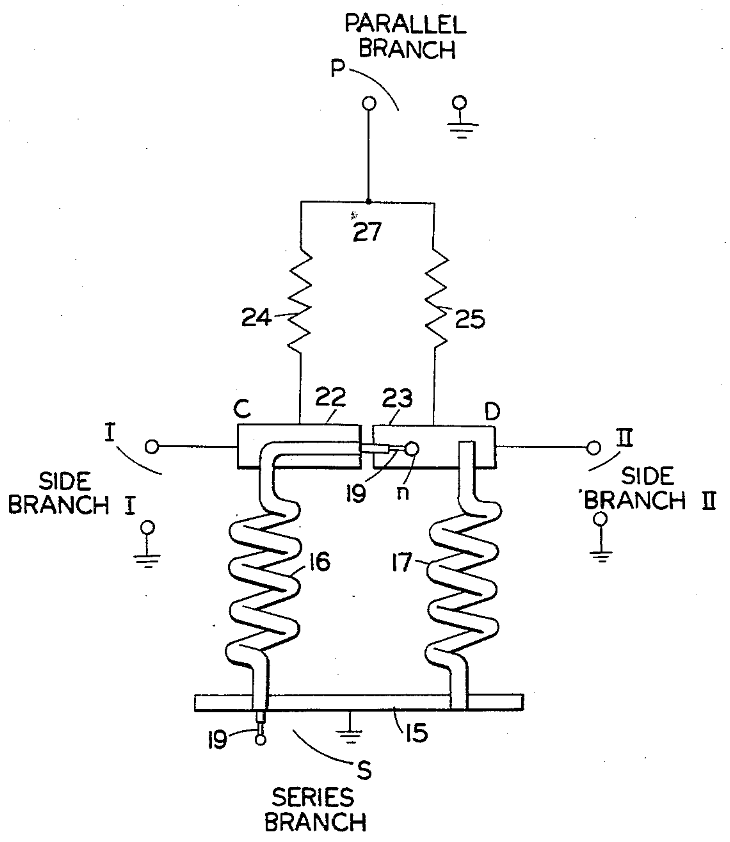

Referring to Fig. 7, there is shown a schematic representation of the embodiment of the invention described above. Reference symbols identifying elements in the other portions of the drawings designate corresponding parts of the schematic representation. A signal applied to the series feed input branch between ground and the inner conductor 19 of the coaxial transmission line 17 is converted into a signal which is balanced with respect to ground between conducting bars 22 and 23. If the loads connected to side terminals I and II are equal and resistors 24 and 25 are the same, the current to ground through each of the latter resistors is of the same magnitude but of opposite sense. As a result, the potential at junction 27 corresponds to ground potential. An unbalance in the loads connected between each side terminal and ground is indicated by a deviation in the potential on junction 27, the P terminal, from ground potential.

The side terminal loads are effectively energized in series from a source connected to the S input, for energy travels from the outer conductor connected to bar 22, through the load connected between side terminal I and ground, through the load connected between ground and side terminal II and through bar 23 to the inner conductor 19. Energy from a source connected to the P input is delivered to the side terminal loads through parallel paths respectively including resistors 24 and 25.

There has been described a network which exhibits hybrid properties over an exceptionally wide frequency range. It is apparent that those skilled in the art may now make numerous modifications of and departures from the specific embodiments described herein without departing from the inventive concepts. Consequently, the invention is to be construed as limited only by the spirit and scope of the appended claims.

Having now described my invention, I claim:

1. An electrical network exhibiting hybrid properties comprising, four terminal pairs each having high and low terminals with the low terminals conductively interconnected, first and second resistors connected in series, a first of said high terminals being connected to the junction of said serially-connected resistors, a second and third of said high terminals being connected to the ends of said first and second resistors respectively away from said junction, and means for converting an unbalanced signal on the fourth of said high terminals into a balanced signal which is applied across said serially-connected resistors, said means providing an impedance between each of said second and third terminal pairs and said fourth terminal pair higher than that of said serially-connected resistors.

2. An electrical network in accordance with claim 1 wherein said means comprises, a coiled coaxial transmission line having an inner and outer conductor with the inner conductor connected between said third and fourth high terminals and the outer conductor connected between said conductively interconnected low terminals and said second high terminal, and a coiled conductor beside and substantially the mirror image of said outer conductor, said coiled conductor being connected between said conductively interconnected low terminals and said third high terminal.

3. An electrical network in accordance with claim 2 wherein the means conductively interconnecting said low terminals includes a conducting shield symmetrically surrounding said resistors, said coiled coaxial transmission line and said coiled conductor.

4. An electrical network in accordance with claim 3 wherein said resistors are substantially equal.

References Cited in the file of this patent

UNITED STATES PATENTS

| | | |
|---|---|---|
| 1,371,471 | Cohen | Mar. 15, 1921 |
| 2,594,167 | Herold | Apr. 22, 1952 |
| 2,769,146 | Alford | Oct. 30, 1956 |

FOREIGN PATENTS

| | | |
|---|---|---|
| 724,131 | Germany | Aug. 19, 1942 |